(12) United States Patent
Gill

(10) Patent No.: US 6,525,911 B1
(45) Date of Patent: Feb. 25, 2003

(54) PERMEABILITY OFFSET OF SHIELD LAYERS FOR CORRECTING BIAS OF A FREE LAYER STRUCTURE IN A SPIN VALVE SENSOR

(75) Inventor: Hardayal Singh Gill, Portala Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/528,793

(22) Filed: Mar. 16, 2000

(51) Int. Cl.[7] .............................................. G11B 5/127
(52) U.S. Cl. ...................................................... 360/319
(58) Field of Search ........................................ 360/319

(56) References Cited

U.S. PATENT DOCUMENTS

| | | | |
|---|---|---|---|
| 5,696,656 A | 12/1997 | Gill et al. ................... | 360/113 |
| 5,818,684 A * | 10/1998 | Iwasaki et al. ............. | 360/113 |
| 6,243,241 B1 * | 6/2001 | Kanai ...................... | 360/324.11 |

* cited by examiner

Primary Examiner—David Davis
(74) Attorney, Agent, or Firm—Ervin F. Johnston

(57) ABSTRACT

The permeability of one of the first and second shield layers in a read head is greater than the permeability of the other of the first and second shield layers for providing a net image current field $H_{IM}$ which can be employed for counterbalancing other fields acting on a free layer structure in a spin valve sensor such as a sense current field $H_I$ in either a top or bottom single spin valve sensor or a net ferromagnetic coupling field $H_{FC}$ alone or in combination with a demagnetizing field $H_D$ in a dual spin valve sensor. Preferred high permeability materials are nickel iron or nickel iron alloys excluding cobalt and low permeability materials are cobalt based.

64 Claims, 11 Drawing Sheets

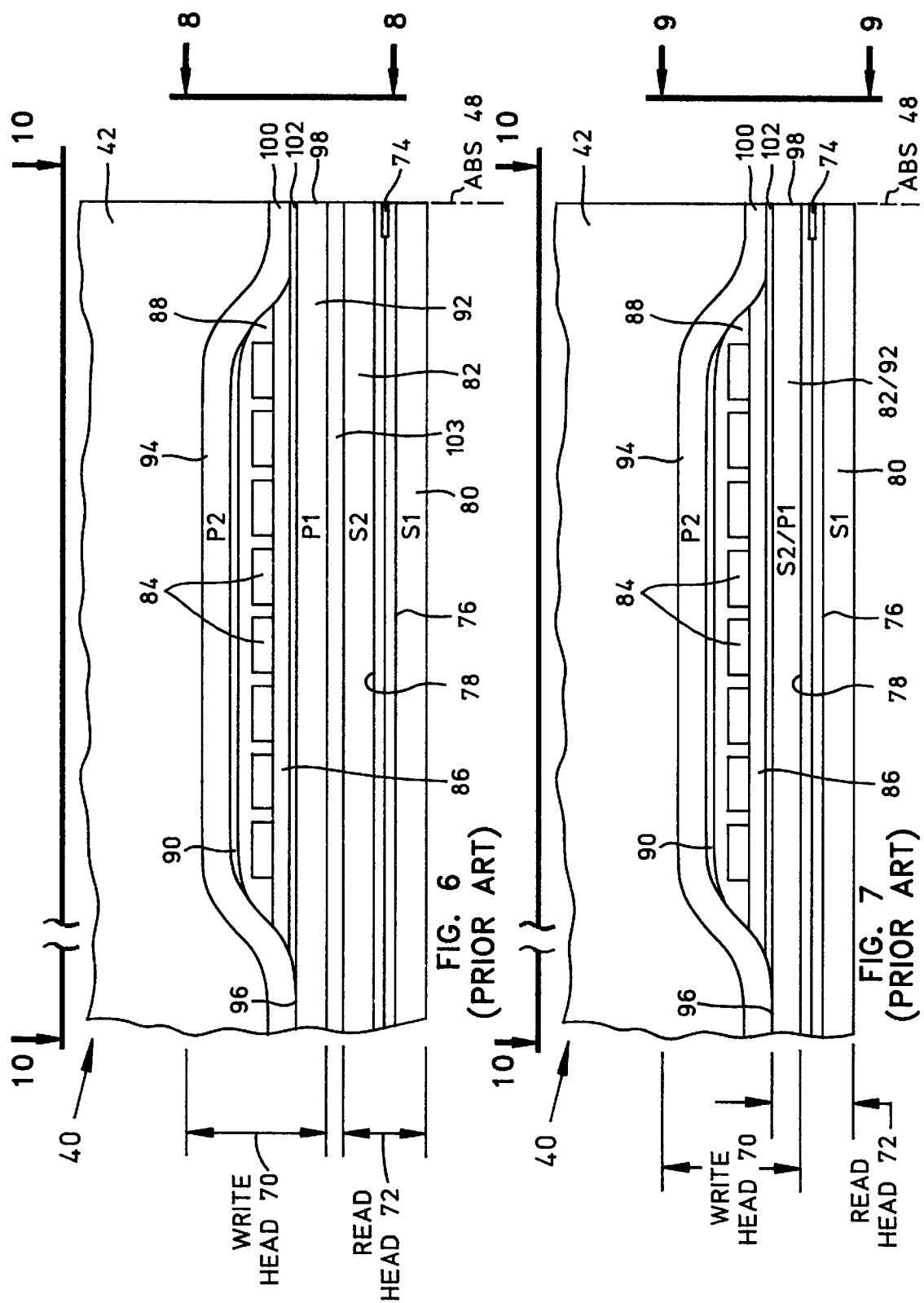

(ABS)

PERMEABILITY OFFSET OF SHIELD LAYERS FOR CORRECTING BIAS OF A FREE LAYER STRUCTURE IN A SPIN VALVE SENSOR

BACKGROUND OF THE INVENTION

1. Field of the Invention

The present invention relates to permeability offset of shield layers for correcting the bias of a free layer structure in a spin valve sensor and, more particularly, to such shield layers which exert a net image current field $H_{IM}$ for counterbalancing other fields acting on the free layer structure.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive spacer layer sandwiched between a ferromagnetic pinning layer and a ferromagnetic free layer. An antiferromagnetic pinning layer interfaces the pinned layer for pinning the magnetic moment of the pinned layer 90° to an air bearing surface (ABS) wherein the ABS is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos \theta$, where $\theta$ is the angle between the magnetic moments of the pinned and free layers. When a sense current is conducted through the spin valve sensor, resistance changes cause potential changes that are detected and processed as playback signals from the rotating magnetic disk. The sensitivity of the spin valve sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. Because of the high magnetoresistance of a spin valve sensor it is sometimes referred to as a giant magnetoresistive (GMR) sensor.

An improved spin valve sensor, which is referred to hereinafter as antiparallel pinned (AP) spin valve sensor, is described in commonly assigned U.S. Pat. No. 5,465,185 to Heim and Parkin which is incorporated by reference herein. The AP spin valve differs from the spin valve described above in that the pinned layer comprises multiple thin films, hereinafter referred to as AP pinned layer. The AP pinned layer has a nonmagnetic spacer film which is sandwiched between first and second ferromagnetic thin films. The first thin film, which may comprise several thin films, is immediately adjacent to the antiferromagnetic layer and is exchange-coupled thereto, with its magnetic moment directed in a first direction. The second thin film is immediately adjacent to the free layer and is exchange-coupled to the first thin film by the minimal thickness (in the order of 6 Å) of the spacer film between the first and second thin films. The magnetic moment of the second thin film is oriented in a second direction that is antiparallel to the direction of the magnetic moment of the first film. The magnetic moments of the first and second films subtractively combine to provide a net moment of the AP pinned layer. The direction of the net moment is determined by the thicker of the first and second thin films. The thicknesses of the first and second thin films are chosen so that the net moment is small. A small net moment equates to a small demagnetizing (demag) field exerted on the free layer by the AP pinned layer. Since the antiferromagnetic exchange coupling is inversely proportional to the net moment, this results in a large exchange coupling between the pinning and pinned layers.

The transfer curve for a spin valve sensor is defined by the aforementioned $\cos \theta$ where $\theta$ is the angle between the directions of the magnetic moments of the free and pinned layers. In a spin valve sensor subjected to positive and negative magnetic signal fields from a moving magnetic disk, which are typically chosen to be equal in magnitude, it is desirable that positive and negative changes in the resistance of the spin valve read head above and below a bias point on the transfer curve of the sensor be equal so that the positive and negative readback signals are equal. When the direction of the magnetic moment of the free layer is substantially parallel to the ABS and the direction of the magnetic moment of the pinned layer is perpendicular to the ABS in a quiescent state (no signal from the magnetic disk) the positive and negative readback signals should be equal when sensing positive and negative fields that are equal from the magnetic disk. Accordingly, the bias point should be located midway between the top and bottom of the transfer curve. When the bias point is located below the midway point the spin valve sensor is negatively biased and has positive asymmetry and when the bias point is above the midway point the spin valve sensor is positively biased and has negative asymmetry. The designer strives to improve asymmetry of the readback signals as much as practical with the goal being symmetry. When the readback signals are asymmetrical, signal output and dynamic range of the sensor are reduced.

Readback asymmetry is defined as $$\frac{V_1 - V_2}{\max(V_1 \text{ or } V_2)}$$

For example, +10% readback asymmetry means that the positive readback signal $V_1$ is 10% greater than it should be to obtain readback symmetry. 10% readback asymmetry is acceptable in many applications. +10% readback asymmetry may not be acceptable in applications where the applied field magnetizes the free layer close to saturation. In these applications +10% readback asymmetry can saturate the free layer in the positive direction and will reduce the negative readback signal by 10%. An even more subtle problem is that readback asymmetry impacts the magnetic stability of the free layer. Magnetic instability of the free layer means that the applied signal has disturbed the arrangement or multiplied one or more magnetic domains of the free layer. This instability changes the magnetic properties of the free layer which, in turn, changes the readback signal. The magnetic instability of the free layer can be expressed as a percentage increase or decrease in instability of the free layer depending upon the percentage of the increase or decrease of the asymmetry of the readback signal. Standard deviation of the magnetic instability can be calculated from magnetic instability variations corresponding to multiple tests of the free layer at a given readback asymmetry. There is approximately a 0.2% decrease in standard deviation of the magnetic instability of the free layer for a 1% decrease in readback asymmetry. This relationship is substantially linear which will result in a 2.0% reduction in the standard deviation when the readback asymmetry is reduced from +10% to zero. The magnetic instability of the free layer is greater when the readback asymmetry is positive than when the readback asymmetry is negative.

When the sense current $I_S$ is applied to the spin valve sensor there is an image sense current in each of the first and second shield layers. The image sense current in each shield layer causes each shield layer to produce an image sense current field $H_{IM}$ which traverses the free layer in a direction that is substantially perpendicular to the ABS. When the free layer of the AP pinned spin valve is symmetrically located midway between the first and second shield layers the image sense current fields counterbalance each other so that the net image sense current field on the free layer is zero. When the free layer is located asymmetrically between the first and second shield layers, hereinafter referred to as gap offset, a net image sense current field can be employed for counterbalancing the other magnetic fields on the free layer. This is accomplished by sizing the first and second gap layers that separate the free layer from the first and second shield layers respectively so that the free layer is closer to a selected one of the shield layers. It is preferred that the second gap be thinner than the first gap so that the free layer is closer to the second shield layer. When these thicknesses are carefully selected readback asymmetry can be improved so that magnetic stability of the free layer is optimized.

With increasing linear densities of magnetic read heads, a gap offset becomes impractical because of the risk of shorting between first and second lead layers to the spin valve sensor and the shield layers. For instance, in a bottom spin valve, where the free layer structure is closer to the second shield layer than to the first shield layer, the second read gap is typically narrower than the first read gap so that the second shield layer exerts a net imaging current field $H_{IM}$ on the free layer structure for counterbalancing other fields acting thereon. If this second read gap gets too narrow the thickness of the first read gap layer (G1), which is composed of alumina, will be too thin to prevent the lead layers from shorting to the second shield layer. Since the total first read gap is made narrower in order to promote higher linear density of the read head, it becomes difficult to make a gap offset without shorting the lead layers to the second shield layer. The opposite situation is true for a top spin valve where the free layer structure is closer to the first shield layer than to the second shield layer.

In a dual spin valve sensor where the free layer structure is centered between first and second pinned layer structures the demagnetizing field $H_D$ acting on the free layer structure is less than that in a single spin valve sensor. Accordingly, the imaging field $H_{IM}$ in a dual spin valve sensor is important for counterbalancing ferromagnetic coupling fields $H_{FC}$ exerted by the pinned layer structures on the free layer structure.

It is further desirable to employ a metallic pinning layer with the preference being platinum manganese (PtMn). A metallic pinning layer in a single spin valve sensor causes an additional sense current field on the free layer structure and top and bottom metallic pinning layers in a dual spin valve sensor cause the sense current fields therefrom to be substantially counterbalanced. As indicated hereinabove, the preferred pinned layer structure for either the single or dual spin valve sensor is an AP pinned layer structure. It is desirable in any of these embodiments that the second AP pinned layer, which interfaces the spacer layer, be the thicker of the first and second AP pinned layers of the AP pinned layer structure for increasing the magnetoresistive coefficient dr/R of the spin valve sensor. Since a platinum manganese pinning layer causes a negative ferromagnetic coupling field from the second AP pinned layer on the free layer structure this field will be additive to the net demagnetizing field $H_D$ from the second AP pinned layer. Accordingly, this increases the biasing of the free layer structure in one direction which needs to be counterbalanced in order to obtain read signal symmetry. Accordingly, in order to obtain maximum magnetoresistive coefficient dr/R with one or more platinum manganese (PtMn) pinning layers it important that there be a net imaging current field $H_{IM}$ for counterbalancing other fields acting on the free layer structure.

In summary, the location of the transfer curve relative to the bias point is influenced by four major forces on the free layer of a spin valve sensor, namely a ferromagnetic coupling field $H_{FC}$ between the pinned layer and the free layer, a net demag field $H_D$ from the pinned layer, a sense current field $H_I$ from all conductive layers of the spin valve except the free layer and a net image current field $H_{IM}$ from the first and second shield layers. There is a need to deal with these forces on the free layer so as to improve asymmetry of the readback signals.

SUMMARY OF THE INVENTION

The present invention provides a net imaging current field $H_{IM}$ from the first and second shield layers without the necessity of making a gap offset for the purpose of properly biasing the free layer. This is accomplished by making the permeability of one of the first and second shield layers greater than the permeability of the other of the first and second shield layers. Accordingly, the first and second shield layers are made of two different materials in order to provide this permeability offset. It should be understood that permeability $\mu = 4\pi M_S \div H_K$ where $M_S$ is the saturation magnetization of the material and $H_K$ is the uniaxial anisotropy. Uniaxial anisotropy is the amount of applied field required to rotate a magnetic moment of the material 90° from its easy axis. Permeability is a measure of how easy it is to magnetize the material. The higher the permeability, the softer the material. Accordingly, the softer of the two materials is placed in the shield layer where it is desired to obtain the greatest image current field $H_{IM}$. It can be seen from the above formula that the uniaxial anisotropy $H_K$ is inversely proportional to the permeability $\mu$. The preferred high permeability materials are nickel iron (NiFe) based excluding cobalt (Co) and the low permeability materials are cobalt based. As an example the uniaxial anisotropy $H_K$ of nickel iron (NiFe) can be between 1 to 5 Oe and the uniaxial anisotropy $H_K$ of nickel iron cobalt (NiFeCo) can be between 5 to 30 Oe. The uniaxial anisotropy $H_K$ of nickel iron cobalt (NiFeCo) is roughly proportional to the atomic percent of the cobalt (Co). For instance, if the cobalt is 10% in NiFeCo then the $H_K$ is about 10 Oe.

In a bottom spin valve sensor the permeability of the second shield layer is higher than the first shield layer since the free layer structure is typically closer to the second shield layer and is subjected to a net sense current field from conductive layers therebelow. In a top spin valve sensor where the free layer structure is typically closer to the first shield layer the permeability of the first shield layer is higher than the second shield layer since the net sense current field is due to the conductive layers above the free layer structure. In a dual spin valve sensor the net sense current field is low because the conductive layers above and below the free layer structure are essentially the same. However, a net ferromagnetic coupling field and a net demagnetizing field may have to be dealt with which requires a net image current field in order to obtain proper biasing of the free layer structure. These factors are driven by the desire to locate the thicker of the first and second AP pinned layers next to the spacer layer and to employ a pinning layer composed of platinum manganese (PtMn) which has a high blocking temperature.

An object of the present invention is to provide a read head with a net imaging current offset $H_{IM}$ without increasing a gap offset in order to properly bias the free layer.

Another object is to provide an imaging current offset $H_{IM}$ that promotes linear density in a spin valve sensor that employs a platinum manganese (PtMn) pinning layer in an AP pinned layer structure wherein the second AP pinned layer is thicker than the first AP pinned layer and interfaces the spacer layer.

Other objects and advantages of the invention will become apparent upon reading the following description taken together with the accompanying drawings.

DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DETAILED DESCRIPTION OF THE PREFERRED EMBODIMENTS

Magnetic Disk Drive

Figure 1:
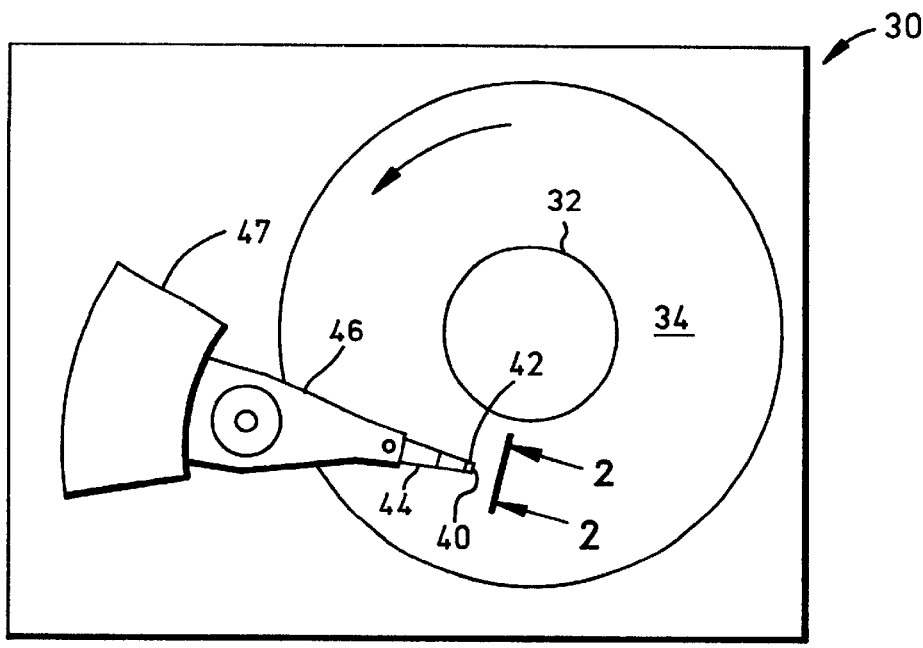
FIG. 1 is a plan view of an exemplary magnetic disk drive.
Figure 2:
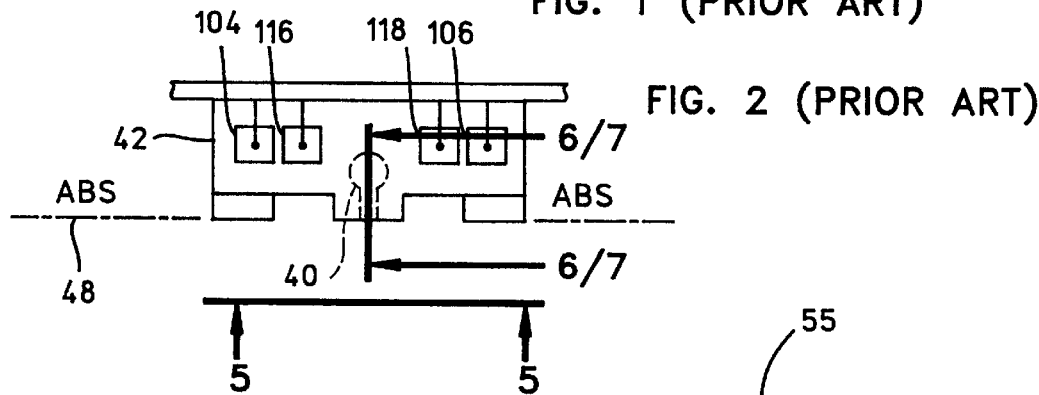
FIG. 2 is an end view of a slider with a magnetic head of the disk drive as seen in plane 2—2 of FIG. 1.
Figure 3:
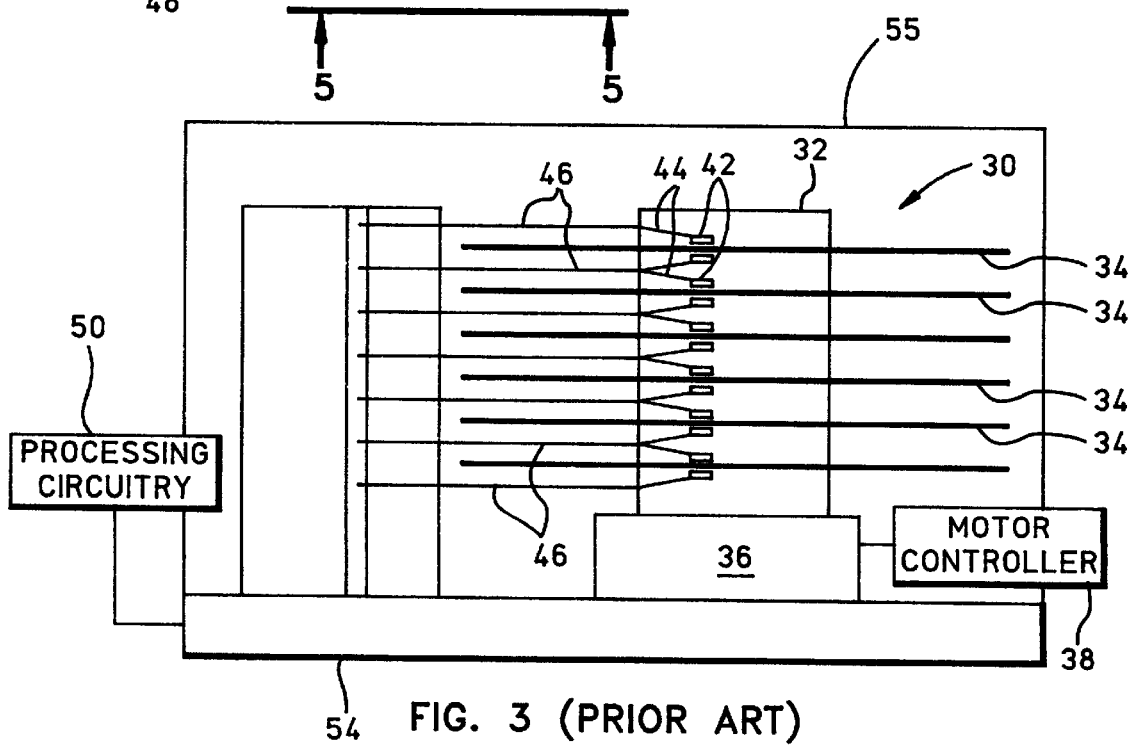
FIG. 3 is an elevation view of the magnetic disk drive wherein multiple disks and magnetic heads are employed.
Figure 4:
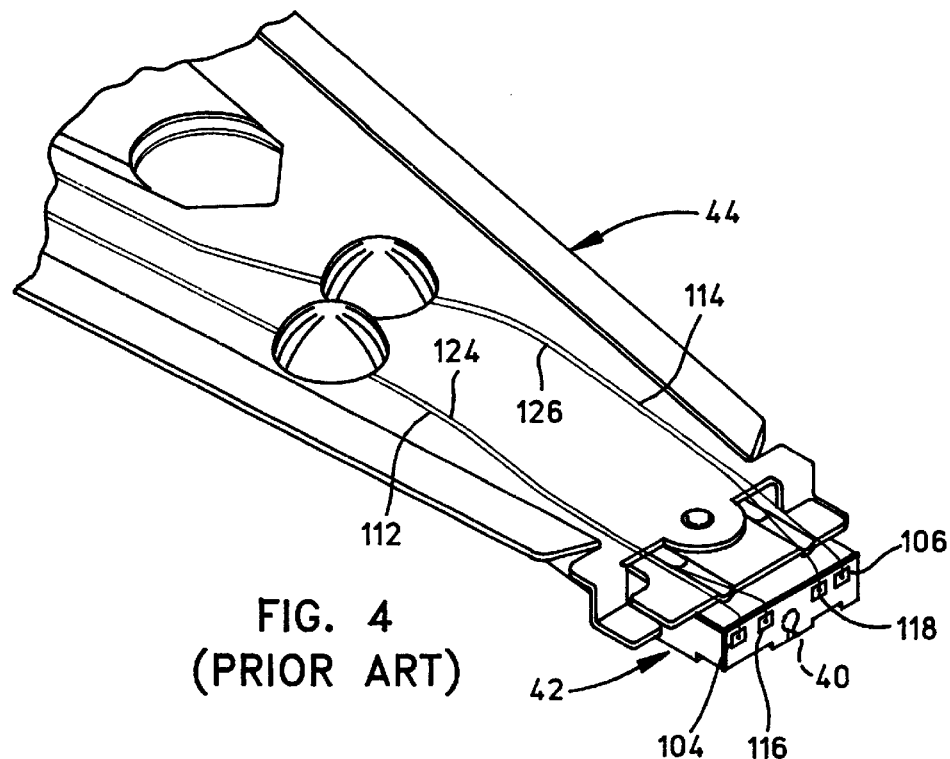
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
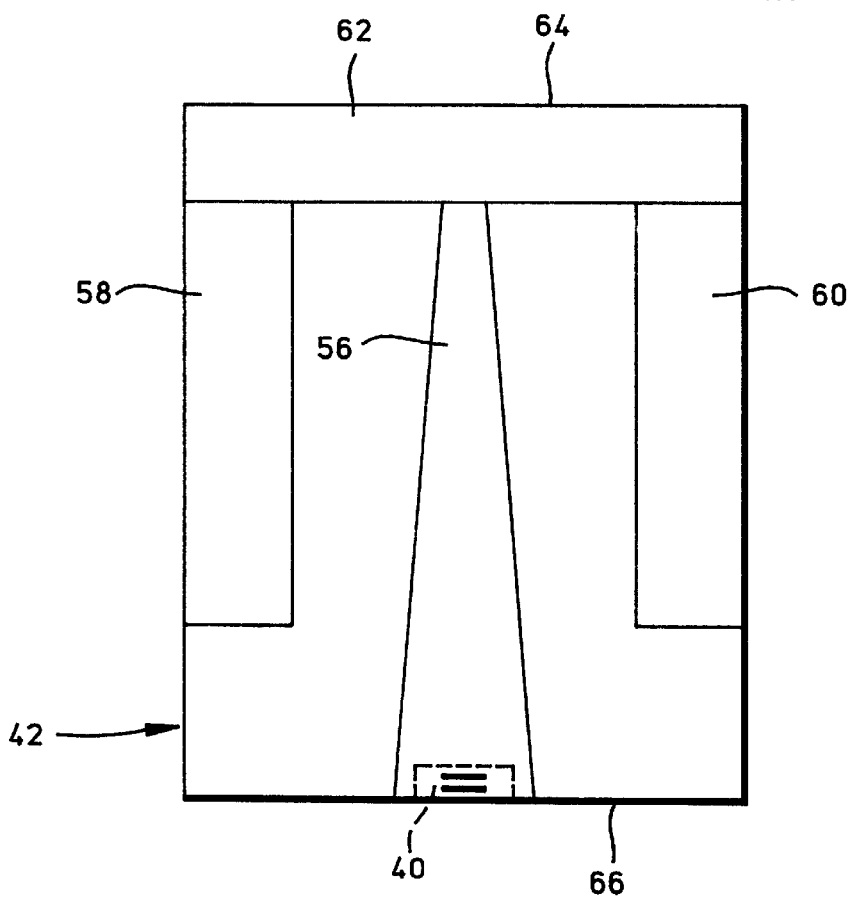
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
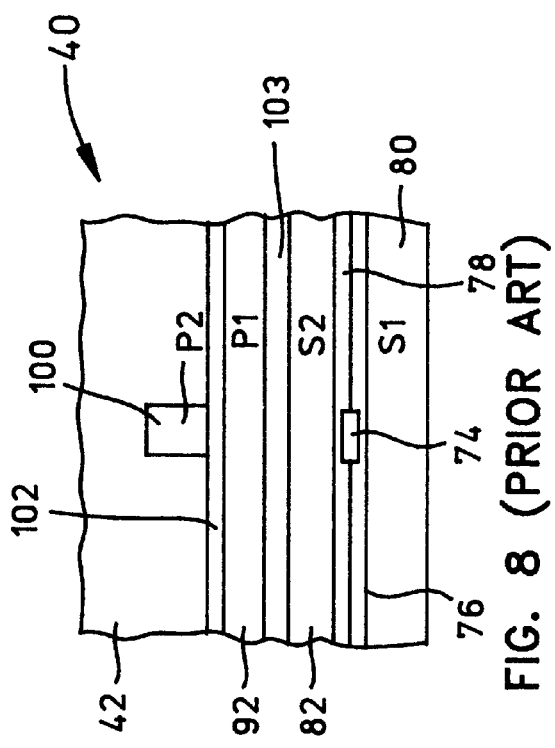
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

Figure 10:
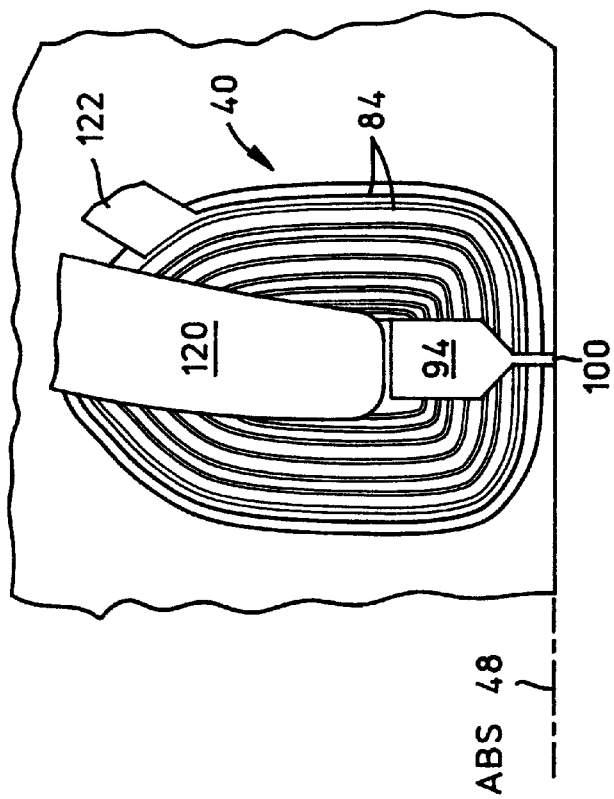
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
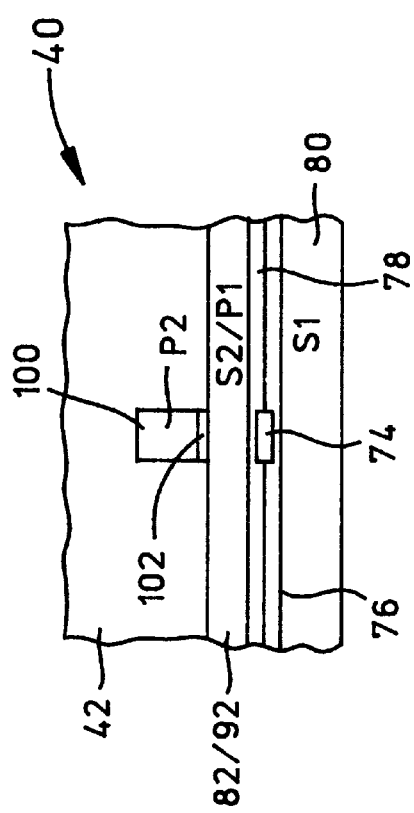
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
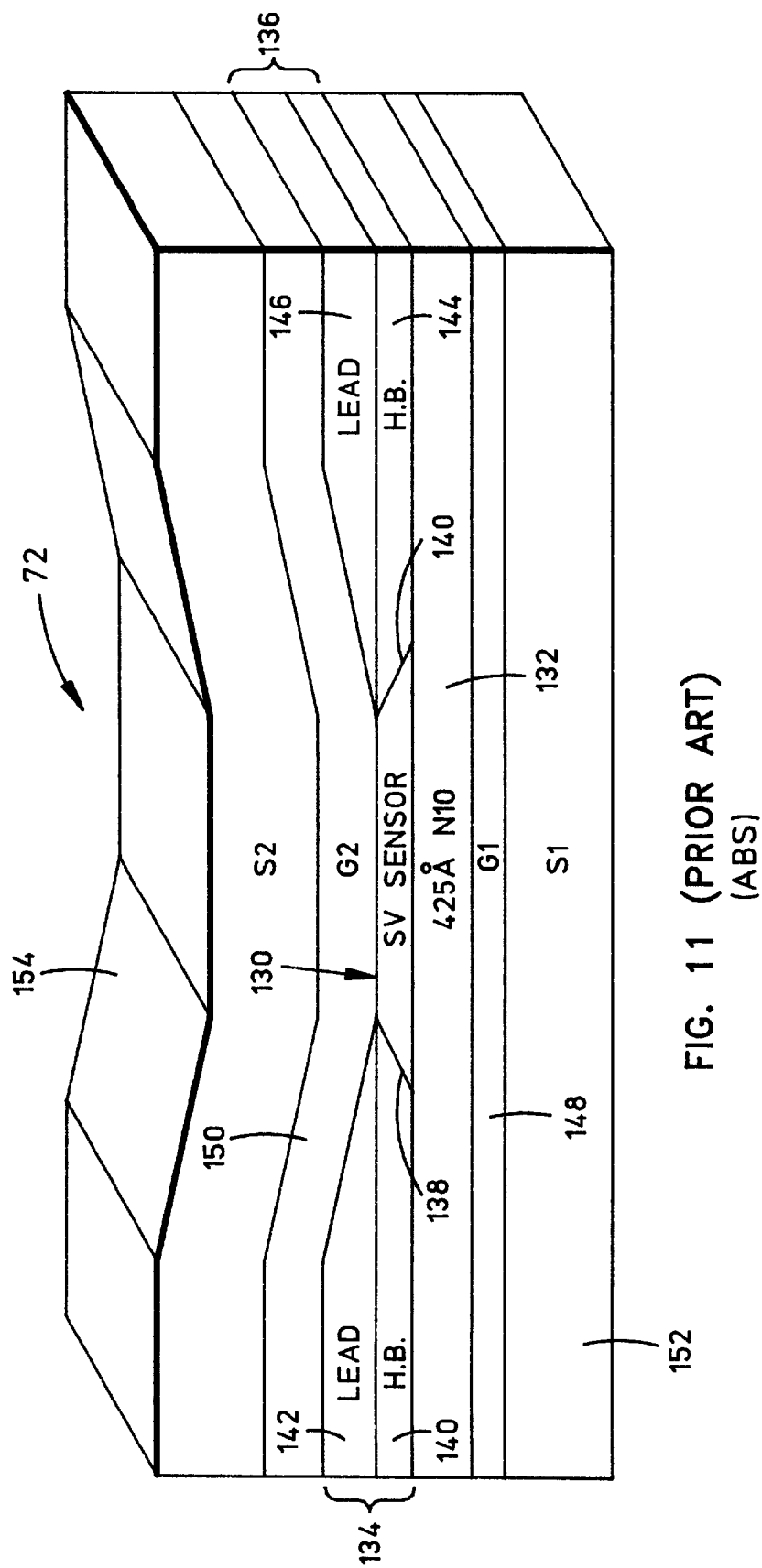
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, is pinned by the magnetic spins of the pinning layer 132. The AFM pinning layer is typically 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Figure 12:
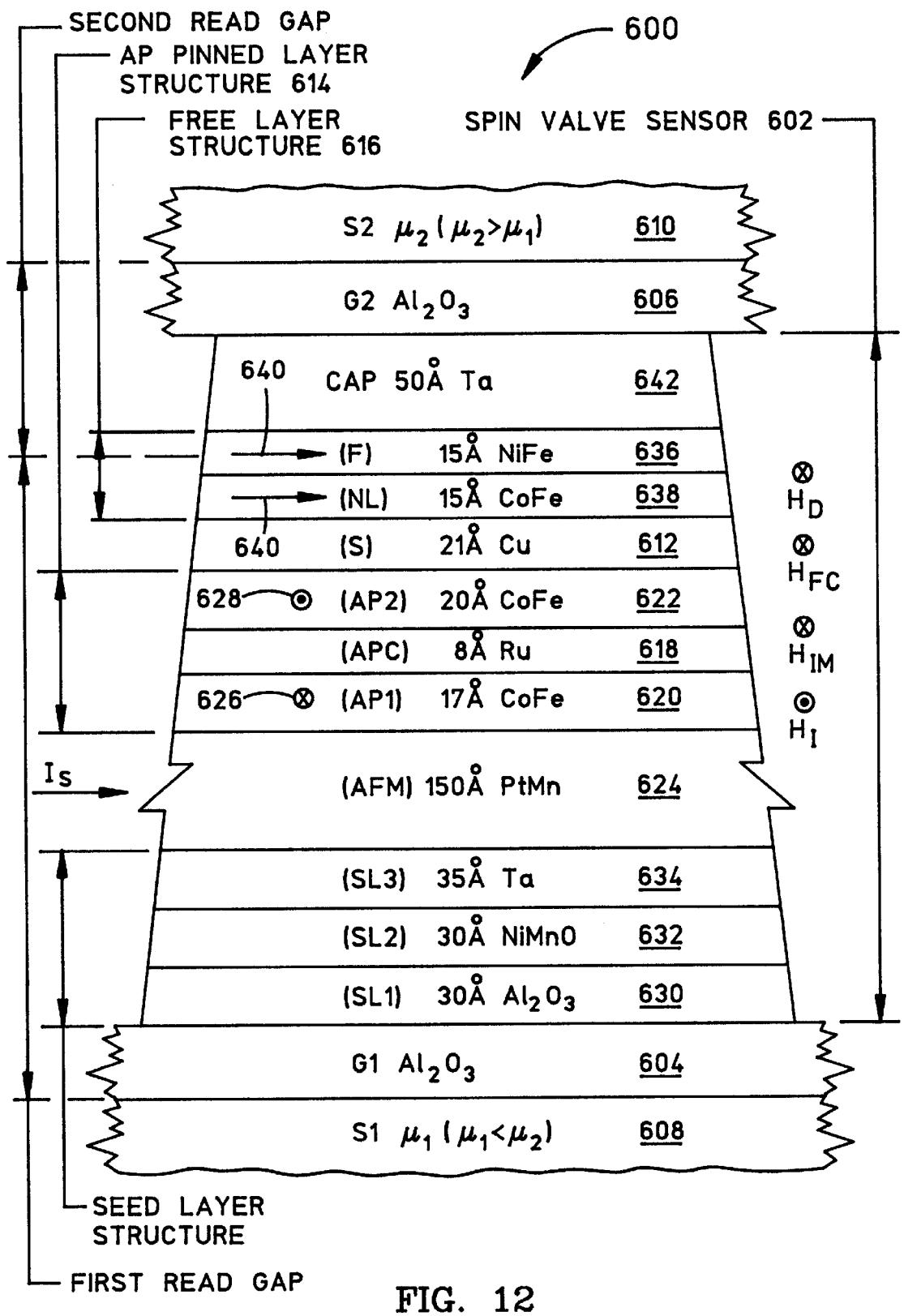
FIG. 12 is an ABS illustration of a first embodiment of the present invention.

An embodiment 600 of the present read head is illustrated in FIG. 12 wherein the read head 600 includes a spin valve sensor 602 which is located between first and second gap layers (G1 and G2) 604 and 606 and the first and second gap layers 604 and 606 are located between first and second shield layers (S1 and S2) 608 and 610. The spin valve sensor 602 includes a nonmagnetic electrically conductive spacer layer 612 which is located between an AP pinned layer structure 614 and a free layer structure 616. The AP pinned layer structure 614 has an antiparallel coupling layer 618 which is located between a ferromagnetic first AP pinned layer (AP1) 620 and a ferromagnetic second AP pinned layer (AP2) 622. The first AP pinned layer 620 is exchange coupled to an antiferromagnetic (AFM) pinning layer 624 SO that a magnetic moment 626 of the first AP pinned layer is pinned perpendicular to the ABS, such as into the sensor as shown in FIG. 12. By a strong antiparallel coupling between the first and second AP pinned layers the second AP pinned layer 622 has a magnetic moment 628 which is antiparallel to the magnetic moment 626. In this embodiment the second AP pinned layer 622 is thicker than the first AP pinned layer 620 SO that a net demagnetizing (demag) field $H_D$ from the AP pinned layer structure 614 on the free layer structure 616 will be antiparallel to the magnetic moment 628.

A first seed layer (SL1) 630 is located on the first gap layer 604, a second seed layer (SL2) 632 is located on the first seed layer 630 and a third seed layer (SL3) 634 is located on the second seed layer 632. These seed layers, which influence the microstructures of subsequent spin valve sensor layers formed thereon, in combination with a predetermined thickness of the spacer layer 612, establish a negative ferromagnetic coupling field $-H_{FC}$, which is in the same direction as the net demag $H_D$ on the free layer structure 616.

The free layer structure 616 includes a ferromagnetic free layer (F) 636 and a ferromagnetic nanolayer (NL) 638. The free layer structure 616 has a magnetic moment 640 which is parallel to the ABS when there is readback symmetry and this direction can be to the left, or to the right as shown in FIG. 12. A cap layer 642 may be on the free layer structure 616 for protecting it from subsequent processing steps. When a signal field from a rotating magnetic disk rotates the magnetic moment 640 upwardly it becomes more antiparallel to the magnetic moment 628 which increases the resistance of the spin valve sensor and when a signal field rotates the magnetic moment 640 downwardly it becomes more parallel to the magnetic moment 628 which decreases the resistance of the head. When the sense current $I_S$ is conducted through the spin valve sensor these changes in resistance cause potential changes which are processed in the processing circuitry 50 in FIG. 3 as playback signals.

Exemplary thicknesses for the first and second gap layers 604 and 606 are 200 Å of aluminum oxide ($Al_2O_3$) for the first gap layer 604 and 200 Å of aluminum oxide ($Al_2O_3$) for the second gap layer 606. Exemplary thicknesses and materials for the spin valve sensor 602 are 30 Å of aluminum oxide ($Al_2O_3$) for the first seed layer 630, 30 Å of nickel manganese oxide (NiMnO) for the second seed layer 632, 35 Å of tantalum (Ta) for the third seed layer 634, 150 Å of platinum manganese (PtMn) for the pinning layer 624, 17 Å of cobalt iron (CoFe) for the first AP pinned layer 620, 8 Å of ruthenium (Ru) for the antiparallel coupling layer 618, 20 Å of cobalt iron (CoFe) for the second AP pinned layer 622, 21 Å of copper (Cu) for the spacer layer 612, 15 Å of cobalt iron (CoFe) for the nanolayer 638, 15 Å of nickel iron (NiFe) for the free layer 636 and 50 Å of tantalum (Ta) for the cap layer 642.

Platinum manganese (PtMn) is the preferred material for the pinning layer 624. The blocking temperature of platinum manganese (PtMn) is 330° C. to 350° C. wherein the blocking temperature is the temperature at which the magnetic spins of the pinning layer are free to rotate in response to a magnetic field. Platinum manganese (PtMn) makes the read head thermally stable during construction of the read head or after its installation on a magnetic disk drive. It should be understood that when an electrostatic discharge (ESD) raises the temperature of the spin valve sensor at or above the blocking temperature of the pinning layer 624 the magnetic moment of the first AP pinned layer 620 is free to rotate in response to a magnetic field such as a signal field from the rotating magnetic disk. Further, in a magnetic disk drive the slider carrying the magnetic head may contact an asperity which raises the temperature of the spin valve sensor above the blocking temperature of the pinning layer which can cause the magnetic moment of the first AP pinned layer 620 to become disoriented in the presence of a magnetic field. If the blocking temperature of the pinning layer 624 is high enough these occurrences will not occur.

When the sense current $I_S$ is conducted through the spin valve sensor in FIG. 12 it can be seen that the net sense current field $H_I$ is directed through the free layer structure 616 thence out of the page due to the large number of conductive layers below the free layer structure. This is the largest of the fields acting on the free layer structure 616 affecting its biasing and must be counterbalanced for read signal symmetry. When the second AP pinned layer 622, which is the thicker of the first and second AP pinned layers 620 and 622, interfaces the spacer layer 612 there is a net demag field $H_D$ through the free layer structure 616 which is directed into the page. When a platinum manganese (PtMn) pinning layer 624 is employed there is a negative ferromagnetic coupling field $H_{FC}$ which is in the same direction as the demag field $H_D$. In this embodiment the permeability of the second shield layer 610 is made greater than the permeability of the first shield layer 608 so that there is a net image current field $H_{IM}$ which works in cooperation with the ferromagnetic coupling field $H_{FC}$ and the demag field $H_D$ to counterbalance the sense current field $H_I$. In the bottom spin valve embodiment shown in FIG. 12 there is typically a gap offset wherein the free layer structure 616 is closer to the second shield layer 610 than it is to the first shield layer 608. This will also cause a net image current field $H_{IM}$ in the same direction as shown in FIG. 12 which is due to a gap offset and which reinforces the image current field $H_{IM}$ due to the permeability offset. In high linear density read heads, however, the gap offset does not have to be increased to properly bias the free layer structure 616 since part of the image current field $H_{IM}$ is due to the permeability offset.

Preferred materials for the high permeability second shield layer 610 are nickel iron (NiFe) and nickel iron alloys excluding cobalt and the low permeability material for the first shield layer 608 is preferably cobalt alloys. The high permeability materials are preferably nickel iron (NiFe) or nickel iron molybdenum (NiFeMo) and the low permeability materials are preferably nickel iron cobalt (NiFeCo), cobalt iron hafnium niobium (CoFeHfNb) or nickel cobalt (NiCo).

Figure 13:
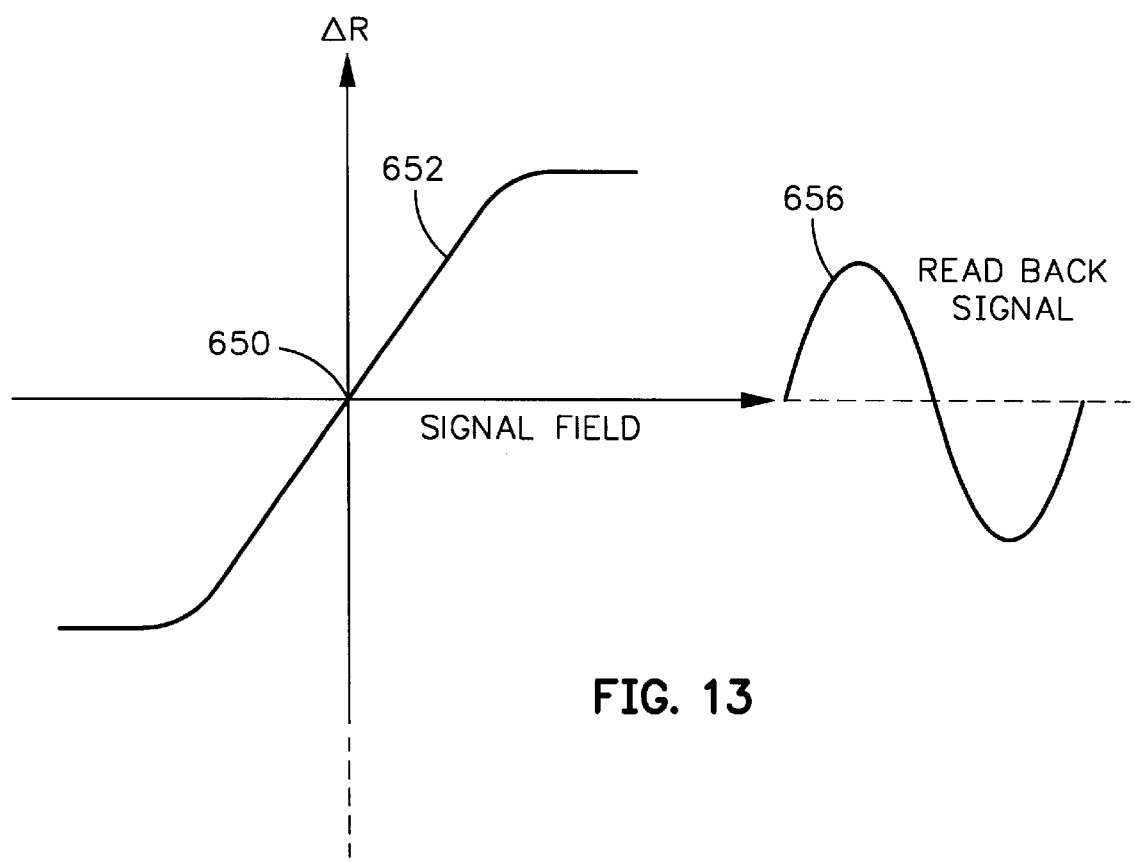
FIG. 13 illustrates a transfer curve and readback signal for a properly biased free layer structure of a spin valve sensor.
Figure 14:
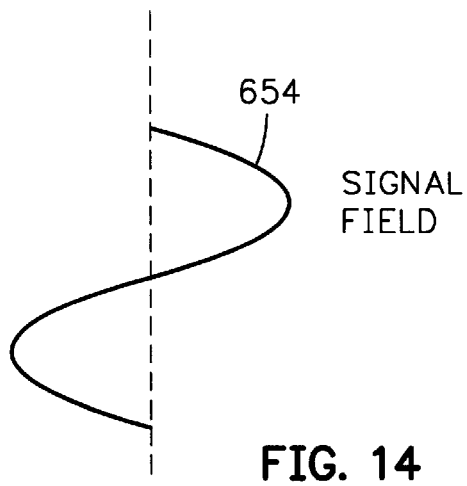
FIG. 14 illustrates an applied field to the spin valve sensor causing the curves shown in FIG. 13.

FIGS. 13 and 14 show graphs for a properly biased free layer structure of a spin valve sensor. In FIG. 13 a zero bias point 650 is shown midway on a transfer curve 652 of the spin valve sensor. In response to signal fields 654 from a rotating magnetic disk the readback signals 656 are symmetrical. When the signal field 654 increases the resistance of the spin valve sensor the read head produces a positive readback signal and when the signal field 654 decreases the resistance of the spin valve sensor the read head produces a negative readback signal. When the bias point 650 is lowered on the transfer curve 652 the read head is said to have positive asymmetry because the positive portion of the readback signal 656 is greater than the negative portion and when the bias point 650 is moved upwardly on the transfer curve 652 the read head has negative asymmetry because the negative portion of the readback signal 656 is greater than the positive portion thereof. Exemplary fields acting on the free layer structure 616 in FIG. 12 are 20 Oe for the sense current field $H_I$, 10 Oe for the ferromagnetic coupling field $H_{FC}$, 5 Oe for the net demagnetization field $H_D$ and 10 Oe for the imaging current field $H_{IM}$. This would cause a net field acting on the free layer structure 616 of about 5 Oe. Each oersted causes about one degree of asymmetry which means that for the values given the read head would have five degrees of asymmetry. Since the net field would rotate the magnetic moment 640 of the free layer structure slightly downwardly toward a more antiparallel position relative to the magnetic moment 628 of the second AP pinned layer the resistance of the spin valve sensor increases which would cause the bias point 650 in FIG. 13 to be located above its present position on the transfer curve 652. In this instance the magnetic head is negatively biased and the negative portion of the readback signal 656 will be greater than the positive portion thereof. Readback asymmetry on the order of 5% is acceptable in the trade, however, in the present invention the thicknesses of the layers and their arrangement can be adjusted so that the sense current field $H_I$ completely counterbalances the ferromagnetic coupling field $H_{FC}$, the demagnetization field $H_D$ and the imaging current field $H_{IM}$.

Figure 15:
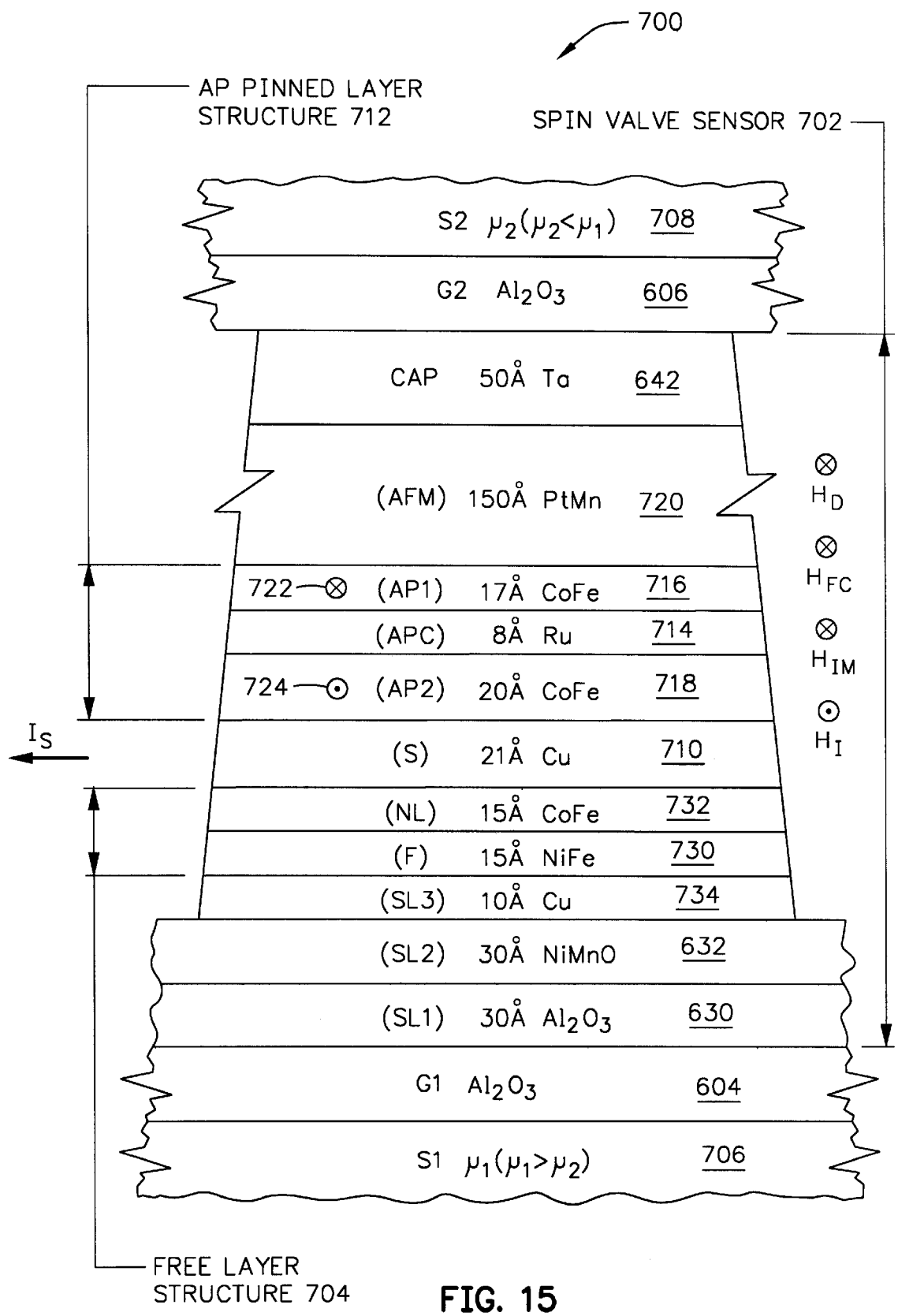
FIG. 15 is an ABS illustration of a second embodiment of the present invention.

FIG. 15 illustrates another embodiment of the present read head 700 wherein a top spin valve sensor 702 is employed and is similar to the bottom spin valve sensor 600 shown in FIG. 12, except the order of the majority of the spin valve sensor layers have been reversed, with a free layer structure 704 being located closer to a first shield layer 706 than it is to a second shield layer 708. The spin valve sensor 702 includes a nonmagnetic conductive spacer layer (S) 710 which is located between the free layer structure 704 and an AP pinned layer structure 712. The AP pinned layer structure 712 includes an antiparallel coupling (APC) layer 714 which is located between first and second AP pinned layer (AP1) and (AP2) 716 and 718. The second AP pinned layer 718, which is thicker than the first AP pinned layer 716, interfaces the spacer layer 710 for promoting a higher magnetoresistive coefficient dr/R. A platinum manganese (PtMn) pinning layer 720 interfaces the first AP pinned layer 716 for pinning its magnetic moment 722 perpendicular to the ABS and into the page which causes the magnetic moment 724 of the second AP pinned layer to be antiparallel thereto. Accordingly, there is a net demag field $H_D$ on the free layer structure which is perpendicular to the ABS and directed into the page due to the higher magnetic moment 724 and there is a net ferromagnetic coupling field $H_{FC}$ which is parallel to the demag field $H_D$ due to the fact that the pinning layer 720 is platinum manganese (PtMn). To obtain proper balancing the sense current $I_S$ is opposite to the sense current $I_S$ in FIG. 12 which causes a sense current field $H_I$ on the free layer structure 704 which is directed out of the page. In order to achieve proper balancing the first shield layer 706 is provided with a permeability which is greater than the permeability of the second shield layer 708. This causes a net image current field $H_{IM}$ on the free layer structure 704 which is directed into the page an is additive with the ferromagnetic coupling field $H_{FC}$ and the net demag field $H_D$ for counterbalancing the net sense current field $H_I$.

The top spin valve sensor in FIG. 15 has a read gap offset which is in an opposite direction to that described for the bottom spin valve sensor shown in FIG. 12. In the top spin valve sensor 700 the free layer structure 704 is located closer to the first shield layer 706 than it is to the second shield layer 708 so that there is a net image current field $H_{IM}$ due to gap offset which supports the image current field $H_{IM}$ due to the permeability offset. It should be noted, however, that the gap offset in a top spin valve sensor cannot be reduced as much as it is in a bottom spin valve sensor since the second read gap layer 606 has an extra thickness requirement over that of the first read gap layer 604 since the second read gap layer 606 must cover steps in the first and second lead layers to the spin valve sensor sufficiently to prevent pin holes which will short the lead layers to the second shield layer 708.

The free layer structure 704 in FIG. 15 includes a free layer (F) 730 which may be 15 Å of nickel iron (NiFe) and a nanolayer (NL) 732 which may be 15 Å of cobalt iron (CoFe). The nanolayer 732 interfaces the spacer layer 710 for promoting the magnetoresistive coefficient dr/R. With this arrangement it has been found desirable to employ a third seed layer (SL3) 734 which is located between the free layer 730 and the second seed layer 632 for promoting a desirable microstructure of the free layer structure. The thicknesses and materials for the remainder layers of the top spin valve sensor in FIG. 15 are similar to the thicknesses and materials of the bottom spin valve sensor in FIG. 12.

Figure 16:
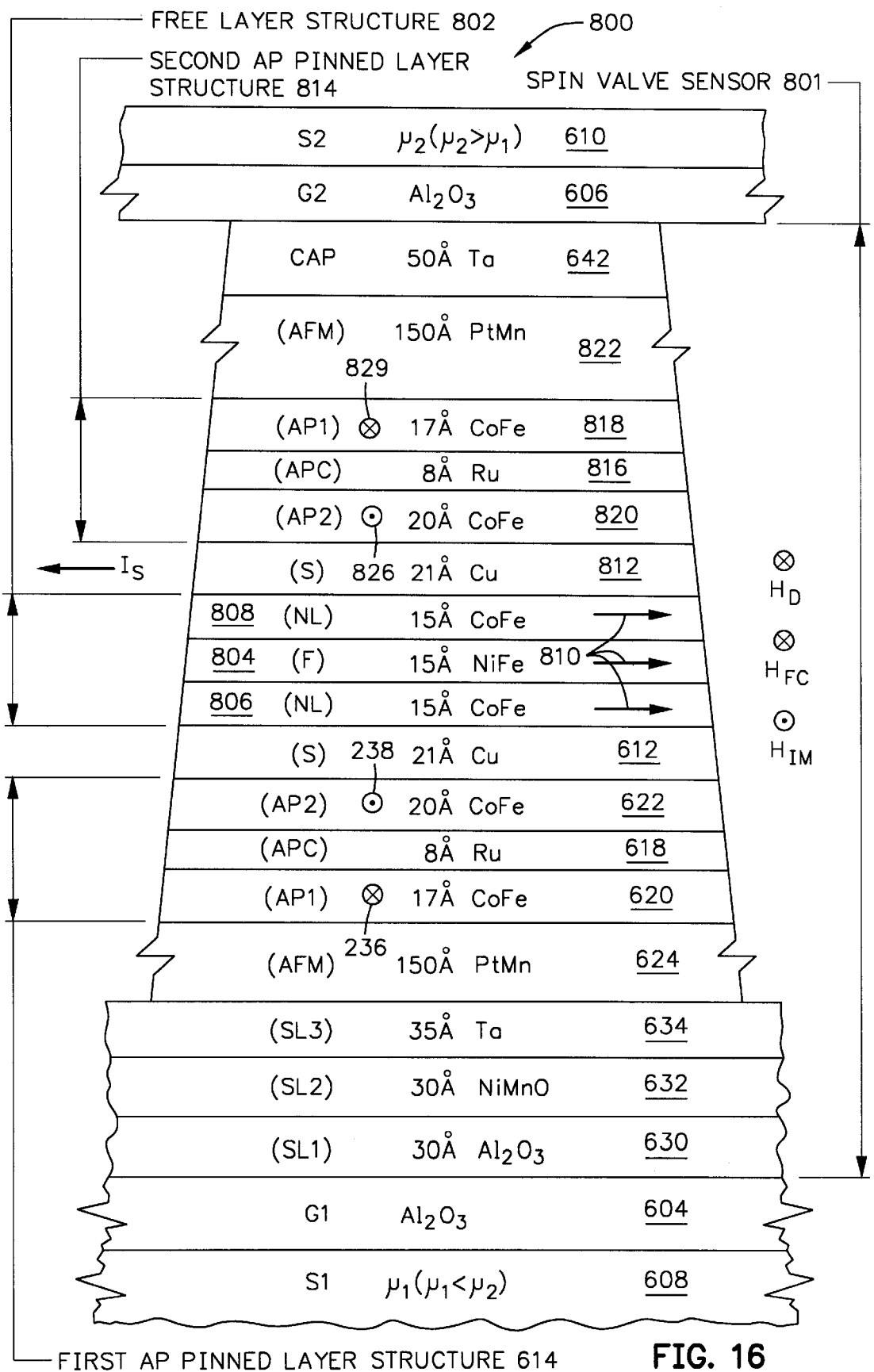
FIG. 16 is an ABS illustration of a third embodiment of the present invention.

A third embodiment 800 of the present invention is illustrated in FIG. 16 which is a dual spin valve sensor. The dual spin valve sensor 800 is the same as the spin valve sensor 600 in FIG. 12 except for a free layer structure 802 and layers thereabove. The free layer structure 802 includes a free layer (F) 804 which is located between first and second nanolayers (NL) 806 and 808. The free layer structure 802 has a magnetic moment 810 which may be directed from left to right as shown. The thicknesses and materials for the layers of the free layer structure may be 15 Å of nickel iron (NiFe) for the free layer 804 and 15 Å of cobalt iron (CoFe) for each of the first and second nanolayers 806 and 808.

A nonmagnetic nonconductive second spacer layer 812 is located between the free layer structure 802 and a second AP pinned layer structure 814. The AP pinned layer structure 814 includes an antiparallel coupling (APC) layer 816 which is located between first and second AP pinned layers 818 and 820. Exemplary thicknesses and materials for the AP pinned layer structure 814 are 8 Å of ruthenium for the antiparallel coupling (APC) layer 816, 17 Å of cobalt iron (CoFe) for the first AP pinned layer 818 and 20 Å of cobalt iron (CoFe) for the second AP pinned layer 820. Like for the first AP pinned layer 614 the thicker second AP pinned layer 820 of the second AP pinned layer structure interfaces the spacer layer 812 for promoting the magnetoresistive coefficient dr/R.

A second antiferromagnetic (AFM) pinning layer 822 interfaces the first AP pinned layer 818 for pinning its magnetic moment 824 into the page which causes the magnetic moment 826 of the second AP pinned layer to be antiparallel thereto. The second pinning layer 822 is preferably 150 Å of platinum manganese like the first pinning layer 624. The sense current $I_S$ is directed from left to right which results in essentially no sense current field $H_I$ on the free layer structure 802 since the same amount of conductive layers are located at the top and bottom of the free layer structure 802. The ferromagnetic coupling fields due to the magnetic moments 238 and 826 of the second AP pinned layers 622 and 820 will be additive, however, resulting in a net ferromagnetic coupling field $H_{FC}$ which is directed into the paper due to the employment of platinum manganese (PtMn) for the first and second pinning layers 624 and 822. The demag fields due to the magnetic moments 238 and 826 are likewise additive resulting in a net demag field $H_D$ which is in the same direction as the net ferromagnetic coupling field $H_{FC}$. In order to counterbalance the fields $H_D$ and $H_{FC}$ the first shield layer 608 is provided with a permeability which is greater than the permeability of the second shield layer 610 so that there is a net image current field $H_{IM}$ which is antiparallel to the fields $H_D$ and $H_{FC}$ for counterbalancing them. It should be noted that for the read head 800 in FIG. 12 that there is only a slight read gap offset due to the seed layers 630, 632 and 634 with the free layer structure 802 being slightly closer to the second shield layer 610. This will cause a slight image current field $H_{IM}$ due to read gap offset which opposes the image current field due to the permeability offset.

Figure 17:
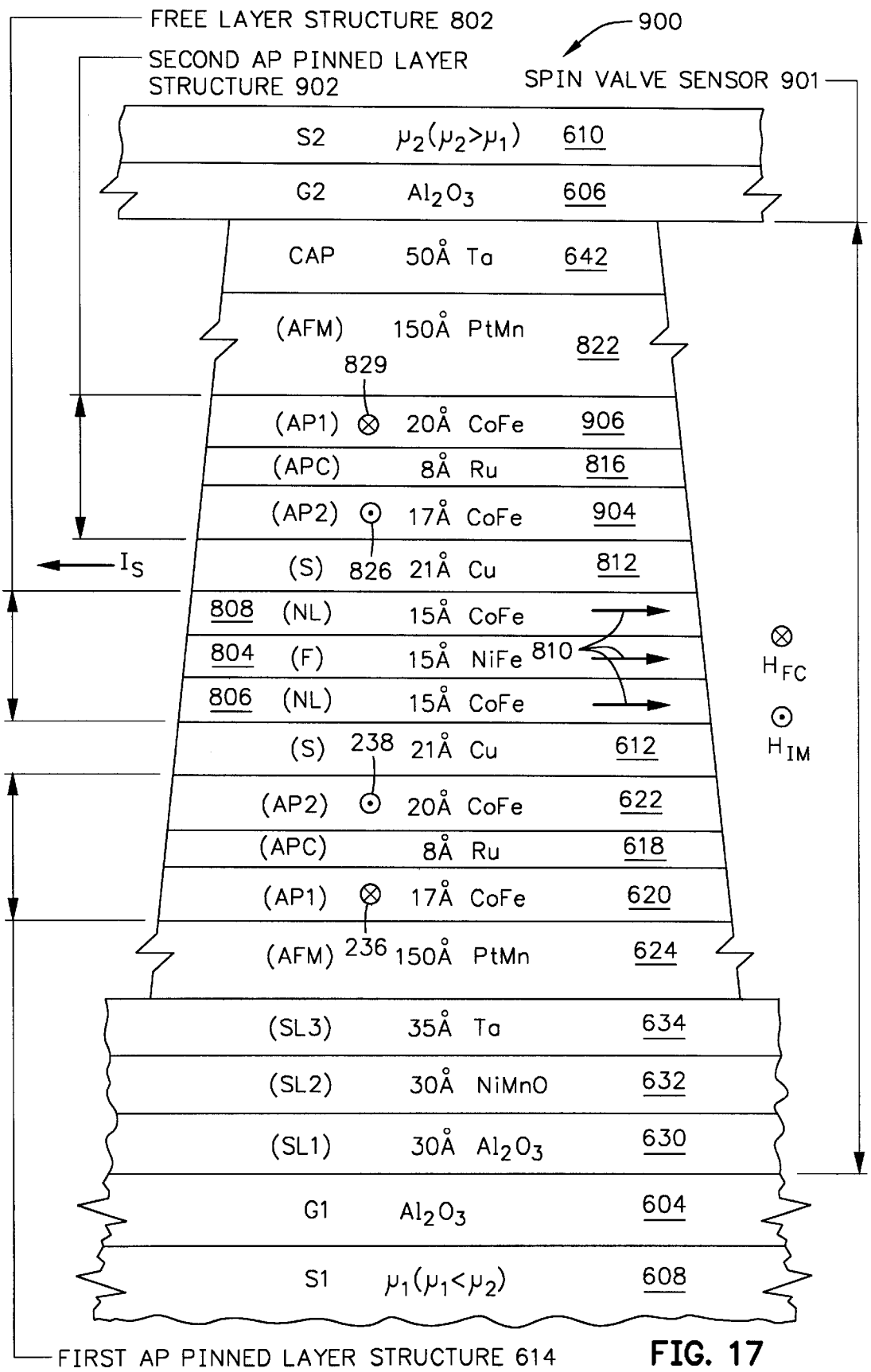
FIG. 17 is an ABS illustration of a fourth embodiment of the present invention.

Another read head embodiment 900 has a dual spin valve sensor 901, shown in FIG. 17, which is the same as the dual spin valve sensor 801, shown in FIG. 16, except for the second AP pinned layer structure 902. In the second AP pinned layer structure 902 the first AP pinned layer 906 is 20 Å of cobalt iron (CoFe) and the second AP pinned layer 904 is 17 Å of cobalt iron (CoFe). This causes the second AP pinned layer structure 902 to have a demag field which completely counterbalances the net demag field from the first AP pinned layer structure 614. Accordingly, the spin valve sensor 901 in FIG. 17 has no net demag field $H_D$ which results in complete flux closure between the first and second AP pinned layer structures 614 and 902. There still remains a net ferromagnetic coupling field $H_{FC}$ which is due to ferromagnetic coupling fields from the magnetic moments 238 and 826 which are additive. There is essentially no sense current field $H_I$ on the free layer structure 902 since there is essentially the same amount of conductive material above and below the free layer structure. With the sense current $I_S$ going from right to left, as shown in FIG. 17, the second shield layer 610 is provided with a permeability which is greater than the permeability of the first shield layer 608 so that the net image current field $H_{IM}$ counterbalances the net ferromagnetic coupling field $H_{FC}$. Again, the free layer structure 902 is slightly closer to the second shield layer 610 than it is to the first shield layer 608 due to the thicknesses of the first, second and third seed layers 630, 632 and 634. Accordingly, a slight image current field due to read gap offset is additive with the image current field due to the permeability offset. This additive effect is preferred in both of the embodiments shown in FIGS. 16 and 17 for minimizing the read gap offset and promoting linear read density of the read head. It should be understood, however, that the sense current $I_S$ could be reversed in its direction in each of the embodiments shown in FIGS. 16 and 17 in which case the first shield layer 608 would be provided with a permeability which is greater than the second shield layer 610.

While platinum manganese (PtMn) is preferred for the pinning layers, it should be understood that other metallic antiferromagnetic materials may be employed such as iridium manganese (IrMn), nickel manganese (NiMn), platinum palladium manganese (PtPdMn) and platinum manganese chromium (PtMnCr).

Figure 18:
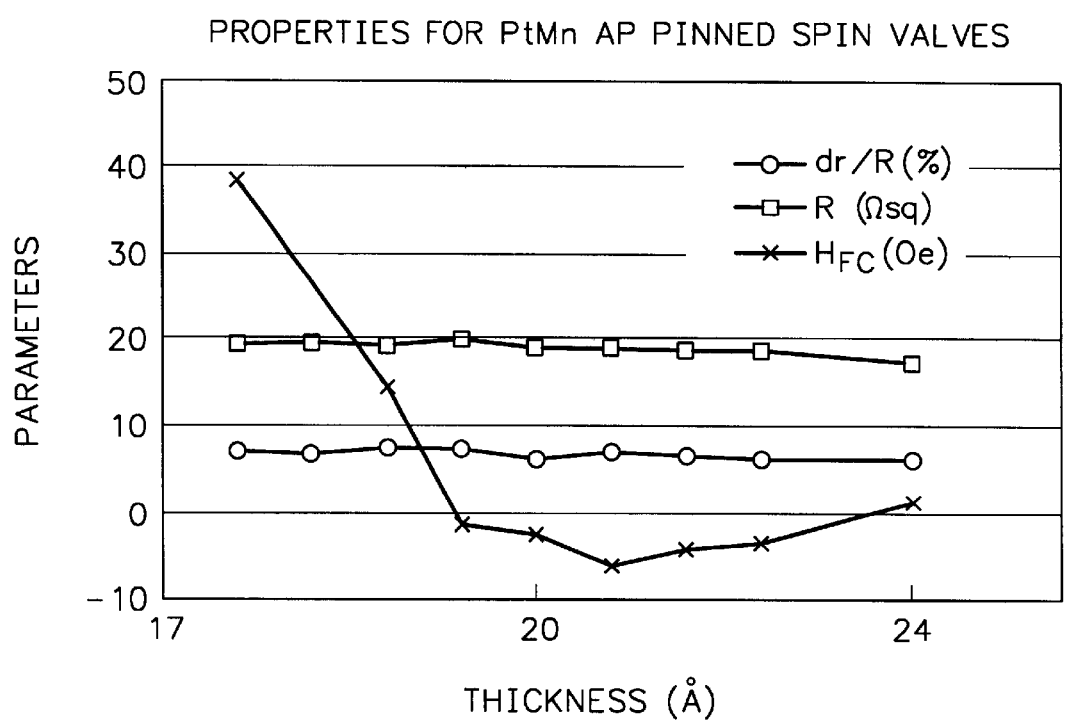
FIG. 18 is a graph illustrating various parameters of a platinum manganese (PtMn) AP pinned spin valve with various thicknesses of its spacer layer.

FIG. 18 shows various parameters for a PtMn AP pinned spin valve wherein the abscissa on the graph shows variations in the thickness of the copper spacer layer, such as spacer layer 612 in FIG. 12, and the ordinate shows the various parameters which are ferromagnetic coupling field $H_{FC}$, resistance R of the sensor and magnetoresistive coefficient dr/R. It can be seen that when the thickness of the spacer layer is in the range of approximately 19 Å to 24 Å that the ferromagnetic coupling field $H_{FC}$ is negative and that for other thicknesses the ferromagnetic coupling field $H_{FC}$ is positive. When the thickness of the spacer layer is 21 Å as shown in the preferred embodiments in FIGS. 12, 15, 16 and 17, the negative ferromagnetic coupling field $-H_{FC}$ is at a maximum of approximately −5 Oe. It should be noted that when the first seed layer 630 is omitted in the spin valve sensors in FIGS. 12, 15, 16 and 17 and the second seed layer 632 is directly on and interfaces the first gap layer 604 that the negative ferromagnetic coupling field $-H_{FC}$ will be about the same as when the first seed layer 630 is employed.

Clearly, other embodiments and modifications of this invention will occur readily to those of ordinary skill in the art in view of these teachings. For instance, instead of one of the AP pinned layers having a thickness greater than the other AP pinned layer, the one AP pinned layer may have a magnetic moment greater than the other AP pinned layer. An example is when the one AP pinned layer is made from cobalt iron ($Co_{90}Fe_{10}$) and the other AP pinned layer is made of nickel iron ($Ni_{80}Fe_{20}$). Cobalt iron ($Co_{90}Fe_{10}$) has a magnetic moment about 1.7 times that of nickel iron ($Ni_{80}Fe_{20}$) so that the one AP pinned layer may have a greater magnetic moment and yet be thinner than the other AP pinned layer. Therefore, this invention is to be limited only by the following claims, which include all such embodiments and modifications when viewed in conjunction with the above specification and accompanying drawings.

I claim:

1. A magnetic read head comprising:
   nonmagnetic nonconductive first and second read gap layers;
   a spin valve sensor located between the first and second read gap layers;
   ferromagnetic first and second shield layers;
   the first and second read gap layers being located between the first and second shield layers with the first read gap layer interfacing the first shield layer and the second read gap layer interfacing the second shield layer;
   the first shield layer being composed of a first material and the second shield being composed of a second material wherein the first and second materials are different; and
   one of the first and second materials having a higher magnetic permeability than the other of the first and second materials.

2. A magnetic read head as claimed in claim 1 wherein the spin valve sensor includes:
   a free layer structure that has a magnetic moment;
   a first ferromagnetic pinned layer structure that has a net magnetic moment;
   a nonmagnetic conductive first spacer layer located between the free layer structure and the first pinned layer structure; and
   a first antiferromagnetic pinning layer exchange coupled to the first pinned layer structure for pinning the net magnetic moment of the first pinned layer structure.

3. A magnetic read head as claimed in claim 2 including:
   a distance from a center of the free layer structure being closer to the shield layer with the material having the highest permeability.

4. A magnetic read head as claimed in claim 2 wherein upon conducting a sense current through the read head a net sense current field acting on the free layer structure from all conductive layers other than the free layer structure is opposed by a net image current field acting on the free layer structure from the first and second shield layers.

5. A magnetic read head as claimed in claim 2 wherein one of the first and second materials is a cobalt alloy and the other of the first and second materials is nickel iron alloy that excludes cobalt.

6. A magnetic read head as claimed in claim 2 including:
   one of the first and second materials being selected from the group consisting essentially of nickel iron (NiFe) and nickel iron molybdenum (NiFeMo) and the other of the first and second materials being selected from the group consisting essentially of nickel iron cobalt (NiFeCo), cobalt iron hafnium niobium (CoFeHfNb) and nickel cobalt (NiCo).

7. A magnetic read head as claimed in claim 2 wherein the first pinned layer structure is a first antiparallel (AP) pinned layer structure that includes:
   ferromagnetic first and second antiparallel (AP) pinned layers with the first AP pinned layer interfacing the first pinning layer and the second AP pinned layer interfacing the spacer layer; and
   an antiparallel (AP) coupling layer located between and interfacing the first and second AP pinned layers.

8. A magnetic read head as claimed in claim 7 wherein the spin valve sensor includes:
   a second antiparallel (AP) pinned layer structure;
   a nonmagnetic conductive second spacer layer located between the free layer structure and the second AP pinned layer structure;
   an antiferromagnetic second pinning layer;
   the second AP pinned layer structure including:
   ferromagnetic first and second antiparallel (AP) pinned layers with the first AP pinned layer interfacing the second pinning layer and the second AP pinned layer interfacing the second spacer layer; and
   an antiparallel (AP) coupling layer located between and interfacing the first and second AP pinned layers.

9. A magnetic read head as claimed in claim 8 wherein upon conducting a sense current through the spin valve sensor, an image current field HIM on the free layer structure equals a demagnetizing field HD and a ferromagnetic field HFC on the free layer structure.

10. A magnetic read head as claimed in claim 9 wherein the second AP pinned layers of the first and second AP pinned layer structures have equal magnetic thicknesses, the first AP pinned layers of the first and second AP pinned layers have equal magnetic thicknesses and the magnetic thicknesses of second AP pinned layers is greater than the magnetic thicknesses of the first AP pinned layers.

11. A magnetic read head as claimed in claim 10 including:
   one of the first and second materials being selected from the group consisting essentially of nickel iron (NiFe) and nickel iron molybdenum (NiFeMo) and the other of the first and second materials being selected from the group consisting essentially of nickel iron cobalt (NiFeCo), cobalt iron hafnium niobium (CoFeHfNb) and nickel cobalt (NiCo).

12. A magnetic read head as claimed in claim 8 wherein upon conducting a sense current through the spin valve sensors a net image current field HIM on the free layer structure equals a ferromagnetic field HFC on the free layer structure.

13. A magnetic read head as claimed in claim 12 wherein:
the first AP pinned layer of the first AP pinned layer structure and the second AP pinned layer of the second AP pinned layer structure have equal magnetic thicknesses and the second AP pinned layer of the first AP pinned layer structure and the first AP pinned layer of the second AP pinned layer structure have equal magnetic thicknesses; and
the magnetic thicknesses of the second AP pinned layer of the first AP pinned layer structure and the first AP pinned layer structure of the second AP pinned layer structure are greater than the magnetic thicknesses of the first AP pinned layer of the first AP pinned layer structure and the second AP pinned layer of the second AP pinned layer structure.

14. A magnetic read head as claimed in claim 13 including:
one of the first and second materials being selected from the group consisting essentially of nickel iron (NiFe) and nickel iron molybdenum (NiFeMo) and the other of the first and second materials being selected from the group consisting essentially of nickel iron cobalt (NiFeCo), cobalt iron hafnium niobium (CoFeHfNb) and nickel cobalt (NiCo).

15. A magnetic read head as claimed in claim 7 wherein upon conducting a sense current through the spin valve sensor, a sense current field HI equals a demagnetizing field HD, a ferromagnetic field HFC and an image current field HIM on the free layer structure.

16. A magnetic read head as claimed in claim 15 wherein:
the free layer structure is closer to the second shield layer than to the first shield layer; and
the second material having a higher permeability than the permeability of the first material.

17. A magnetic read head as claimed in claim 16 including:
the second material being selected from the group consisting essentially of nickel iron (NiFe) and nickel iron molybdenum (NIFeMo) and the first material being selected from the group consisting essentially of nickel iron cobalt (NiFeCo), cobalt iron hafnium niobium (CoFeHfNb) and nickel cobalt (NiCo).

18. A magnetic read head as claimed in claim 15 wherein:
the free layer structure is closer to the first shield layer than to the second shield layer; and
the first material having a higher permeability than the permeability of the second material.

19. A magnetic head assembly comprising:
a write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and a read head including:
nonmagnetic nonconductive first and second read gap layers;
a spin valve sensor located between the first and second read gap layers;
ferromagnetic first and second shield layers; and
the first and second read gap layers being located between the first and second shield layers with the first read gap layer interfacing the first shield layer and the second read gap layer interfacing the second shield layer;
the first shield layer being composed of a first material and the second shield being composed of a second material wherein the first and second materials are different; and
one of the first and second materials having a higher magnetic permeability than the other of the first and second materials.

20. A magnetic head assembly as claimed in claim 19 wherein the first pole layer and the second shield layer are a common layer.

21. A magnetic head assembly as claimed in claim 19 including a nonmagnetic isolation layer located between the second shield layer and the first pole piece layer.

22. A magnetic head assembly as claimed in claim 19 wherein the spin valve sensor includes:
a free layer structure that has a magnetic moment;
a first ferromagnetic pinned layer structure that has a net magnetic moment;
a nonmagnetic conductive first spacer layer located between the free layer structure and the first pinned layer structure; and
a first antiferromagnetic pinning layer exchange coupled to the first pinned layer structure for pinning the net magnetic moment of the first pinned layer structure.

23. A magnetic head assembly as claimed in claim 22 wherein the first pinned layer structure is a first antiparallel (AP) pinned layer structure that includes:
ferromagnetic first and second antiparallel (AP) pinned layers with the first AP pinned layer interfacing the first pinning layer and the second AP pinned layer interfacing the spacer layer; and
an antiparallel (AP) coupling layer located between and interfacing the first and second AP pinned layers.

24. A magnetic head assembly as claimed in claim 23 wherein upon conducting a sense current through the spin valve sensor, a sense current field HI equals a demagnetizing field HD, a ferromagnetic field HFC and an image current field HIM on the free layer structure.

25. A magnetic head assembly as claimed in claim 24 wherein:
the free layer structure is closer to the second shield layer than to the first shield layer; and
the second material having a higher permeability than the permeability of the first material.

26. A magnetic head assembly as claimed in claim 24 wherein:
the free layer structure is closer to the first shield layer than to the second shield layer; and
the first material having a higher permeability than the permeability of the second material.

27. A magnetic head assembly as claimed in claim 23 wherein the spin valve sensor includes:
a second antiparallel (AP) pinned layer structure;
a nonmagnetic conductive second spacer layer located between the free layer structure and the second AP pinned layer structure;

an antiferromagnetic second pinning layer;
the second AP pinned layer structure including:
ferromagnetic first and second antiparallel (AP) pinned layers with the first AP pinned layer interfacing the second pinning layer and the second AP pinned layer interfacing the second spacer layer; and
an antiparallel (AP) coupling layer located between and interfacing the first and second AP pinned layers.

28. A magnetic head assembly as claimed in claim 27 wherein upon conducting a sense current through the spin valve sensor, an image current field HIM on the free layer structure equals a demagnetizing field HD and a ferromagnetic field HFC on the free layer structure.

29. A magnetic head assembly as claimed in claim 28 wherein the second AP pinned layers of the first and second AP pinned layer structures have equal magnetic thicknesses, the first AP pinned layers of the first and second AP pinned layers have equal magnetic thicknesses and the magnetic thicknesses of second AP pinned layers is greater than the magnetic thicknesses of the first AP pinned layers.

30. A magnetic head assembly as claimed in claim 27 wherein upon conducting a sense current through the spin valve sensor, a net image current field HIM on the free layer structure equals a ferromagnetic field HFC on the free layer structure.

31. A magnetic head assembly as claimed in claim 30 wherein:
the first AP pinned layer of the first AP pinned layer structure and the second AP pinned layer of the second AP pinned layer structure have equal magnetic thicknesses and the second AP pinned layer of the first AP pinned layer structure and the first AP pinned layer of the second AP pinned layer structure have equal magnetic thicknesses; and
the magnetic thicknesses of the second AP pinned layer of the first AP pinned layer structure and the first AP pinned layer structure of the second AP pinned layer structure are greater than the magnetic thicknesses of the first AP pinned layer of the first AP pinned layer structure and the second AP pinned layer of the second AP pinned layer structure.

32. A magnetic disk drive including at least one magnetic head assembly that includes a write head and a read head, the read head including a spin valve sensor, comprising:
the write head including:
ferromagnetic first and second pole piece layers that have a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
nonmagnetic nonconductive first and second read gap layers;
a spin valve sensor located between the first and second read gap layers;
ferromagnetic first and second shield layers;
the first and second read gap layers being located between the first and second shield layers with the first read gap layer interfacing the first shield layer and the second read gap layer interfacing the second shield layer;
the first shield layer being composed of a first material and the second shield being composed of a second material wherein the first and second materials are different; and
one of the first and second materials having a higher magnetic permeability than the other of the first and second materials;
a housing;
a magnetic disk rotatably supported in the housing;
a support mounted in the housing for supporting the magnetic head assembly with said ABS facing the magnetic disk so that the magnetic head assembly is in a transducing relationship with the magnetic disk;
a spindle motor for rotating the magnetic disk;
an actuator positioning means connected to the support for moving the magnetic head to multiple positions with respect to said magnetic disk; and
a processor connected to the magnetic head, to the spindle motor and to the actuator for exchanging signals with the magnetic head, for controlling movement of the magnetic disk and for controlling the position of the magnetic head.

33. A magnetic disk drive as claimed in claim 32 wherein the first pole layer and the second shield layer are a common layer.

34. A magnetic disk drive as claimed in claim 32 including a nonmagnetic isolation layer located between the second shield layer and the first pole piece layer.

35. A magnetic disk drive as claimed in claim 32 wherein the spin valve sensor includes:
a free layer structure that has a magnetic moment;
a first ferromagnetic pinned layer structure that has a net magnetic moment;
a nonmagnetic conductive first spacer layer located between the free layer structure and the first pinned layer structure; and
a first antiferromagnetic pinning layer exchange coupled to the first pinned layer structure for pinning the net magnetic moment of the first pinned layer structure.

36. A magnetic disk drive as claimed in claim 35 wherein the first pinned layer structure is a first antiparallel (AP) pinned layer structure that includes:
ferromagnetic first and second antiparallel (AP) pinned layers with the first AP pinned layer interfacing the first pinning layer and the second AP pinned layer interfacing the spacer layer; and
an antiparallel (AP) coupling layer located between and interfacing the first and second AP pinned layers.

37. A magnetic disk drive as claimed in claim 36 wherein upon conducting a sense current through the spin valve sensor, a sense current field HI equals a demagnetizing field HD, a ferromagnetic field HFC and an image current field HIM on the free layer structure.

38. A magnetic disk drive as claimed in claim 37 wherein:
the free layer structure is closer to the second shield layer than to the first shield layer; and
the second material having a higher permeability than the permeability of the first material.

39. A magnetic disk drive as claimed in claim 37 wherein:
the free layer structure is closer to the first shield layer than to the second shield layer; and
the first material having a higher permeability than the permeability of the second material.

40. A magnetic disk drive as claimed in claim 36 wherein the spin valve sensor includes:
- a second antiparallel (AP) pinned layer structure;
- a nonmagnetic conductive second spacer layer located between the free layer structure and the second AP pinned layer structure;
- an antiferromagnetic second pinning layer;
- the second AP pinned layer structure including:
  - ferromagnetic first and second antiparallel (AP) pinned layers with the first AP pinned layer interfacing the second pinning layer and the second AP pinned layer interfacing the second spacer layer; and
  - an antiparallel (AP) coupling layer located between and interfacing the first and second AP pinned layers.

41. A magnetic disk drive as claimed in claim 40 wherein upon conducting a sense current through the spin valve sensor, an image current field HIM on the free layer structure equals a demagnetizing field HD and a ferromagnetic field HFC on the free layer structure.

42. A magnetic disk drive as claimed in claim 41 wherein the second AP pinned layers of the first and second AP pinned layer structures have equal magnetic thicknesses, the first AP pinned layers of the first and second AP pinned layers have equal magnetic thicknesses and the magnetic thicknesses of second AP pinned layers is greater than the magnetic thicknesses of the first AP pinned layers.

43. A magnetic disk drive as claimed in claim 40 wherein upon conducting a sense current through the spin valve sensor, a net image current field HIM on the free layer structure equals a ferromagnetic field HFC on the free layer structure.

44. A magnetic disk drive as claimed in claim 43 wherein:
- the first AP pinned layer of the first AP pinned layer structure and the second AP pinned layer of the second AP pinned layer structure have equal magnetic thicknesses and the second AP pinned layer of the first AP pinned layer structure and the first AP pinned layer of the second AP pinned layer structure have equal magnetic thicknesses; and
- the magnetic thicknesses of the second AP pinned layer of the first AP pinned layer structure and the first AP pinned layer structure of the second AP pinned layer structure are greater than the magnetic thicknesses of the first AP pinned layer of the first AP pinned layer structure and the second AP pinned layer of the second AP pinned layer structure.

45. A method of making a read head comprising the steps of:
- forming nonmagnetic nonconductive first and second read gap layers;
- forming a spin valve sensor between the first and second read gap layers;
- forming ferromagnetic first and second shield layers;
- forming first and second read gap layers between the first and second shield layers with the first read gap layer interfacing the first shield layer and the second read gap layer interfacing the second shield layer;
- forming the first shield layer of a first material and forming the second shield of a second material wherein the first and second materials are different and wherein one of the first and second materials has a higher magnetic permeability than the other of the first and second materials.

46. A method of making a read head as claimed in claim 45 wherein a making of the spin valve sensor includes the steps of:
- forming a free layer structure that has a magnetic moment;
- forming a first ferromagnetic pinned layer structure that has a net magnetic moment;
- forming a nonmagnetic conductive spacer layer between the free layer structure and the first pinned layer structure; and
- forming a antiferromagnetic first pinning layer exchange coupled to the first pinned layer structure for pinning the magnetic moment of the first pinned layer structure.

47. A method of making a read head as claimed in claim 46 wherein the first pinned layer structure is a first antiparallel (AP) pinned layer structure that is made by the following steps:
- forming ferromagnetic first and second antiparallel (AP) pinned layers with the first AP pinned layer interfacing the first pinning layer and the second AP pinned layer interfacing the spacer layer; and
- forming an antiparallel (AP) coupling layer between and interfacing the first and second AP pinned layers.

48. A method of making a read head as claimed in claim 47 wherein the forming of the layers causes a sense current field HI to be equal to a demagnetizing field HD, a ferromagnetic field HFC and an image current field HIM on the free layer structure when a sense current is conducted through the spin valve sensor.

49. A method of making a read head as claimed in claim 48 wherein:
- the free layer structure is formed closer to the second shield layer than to the first shield layer; and
- the permeability of the second material is greater than the permeability of the first material.

50. A method of making a read head as claimed in claim 48 wherein:
- forming the free layer structure closer to the first shield layer than to the second shield layer; and
- forming the first material with a higher permeability than the permeability of the second material.

51. A method of making a read head as claimed in claim 47 wherein the making of the spin valve sensor further includes the steps of:
- forming a second antiparallel (AP) pinned layer structure;
- forming a nonmagnetic conductive second spacer layer located between the free layer structure and the second AP pinned layer structure;
- forming an antiferromagnetic second pinning layer,
- a making of the second AP pinned layer structure including the steps of:
  - forming ferromagnetic first and second antiparallel (AP) pinned layers with the first AP pinned layer interfacing the second pinning layer and the second AP pinned layer interfacing the second spacer layer; and
  - forming an antiparallel (AP) coupling layer between and interfacing the first and second AP pinned layers.

52. A method of making a read head as claimed in claim 51 wherein the second AP pinned layers of the first and second AP pinned layer structures are formed with equal magnetic thicknesses, the first AP pinned layers of the first and second AP pinned layers are formed with equal magnetic thicknesses and the magnetic thicknesses of second AP pinned layers are formed greater than the magnetic thicknesses of the first AP pinned layers.

53. A method of making a read head as claimed in claim 51 wherein:

the first AP pinned layer of the first AP pinned layer structure and the second AP pinned layer of the second AP pinned layer structure are formed with equal magnetic thicknesses and the second AP pinned layer of the first AP pinned layer structure and the first AP pinned layer of the second AP pinned layer structure are formed with equal magnetic thicknesses; and the magnetic thicknesses of the second AP pinned layer of the first AP pinned layer structure and the first AP pinned layer structure of the second AP pinned layer structure are formed greater than the magnetic thicknesses of the first AP pinned layer of the first AP pinned layer structure and the second AP pinned layer of the second AP pinned layer structure.

54. A method of making a magnetic head assembly comprising the steps of:

making a write head including the steps of:
forming ferromagnetic first and second pole piece layers in pole tip, yoke and back gap regions wherein the yoke region is located between the pole tip and back gap regions;
forming a nonmagnetic nonconductive write gap layer between the first and second pole piece layers in the pole tip region;
forming an insulation stack with at least one coil layer embedded therein between the first and second pole piece layers in the yoke region; and
connecting the first and pole piece layers at said back gap region, and making a read head including the steps of:
forming nonmagnetic nonconductive first and second read gap layers;
forming a spin valve sensor between the first and second read gap layers;
forming ferromagnetic first and second shield layers;
forming first and second read gap layers between the first and second shield layers with the first read gap layer interfacing the first shield layer and the second read gap layer interfacing the second shield layer; and
forming the first shield layer of a first material and forming the second shield of a second material wherein the first and second materials are different with one of the first and second materials having a higher magnetic permeability than the other of the first and second materials.

55. A method of making a magnetic head assembly as claimed in claim 54 wherein the first pole layer and the second shield layer are formed as a common layer.

56. A method of making a magnetic head assembly as claimed in claim 54 including forming a nonmagnetic isolation layer between the second shield layer and the first pole piece layer.

57. A method of making a magnetic head assembly as claimed in claim 54 wherein a making of the spin valve sensor includes the steps of:

forming a free layer structure that has a magnetic moment;

forming a first ferromagnetic pinned layer structure that has a net magnetic moment;

forming a nonmagnetic conductive spacer layer between the free layer structure and the first pinned layer structure; and forming a antiferromagnetic first pinning layer exchange coupled to the first pinned layer structure for pinning the magnetic moment of the first pinned layer structure.

58. A method of making a magnetic head assembly as claimed in claim 57 wherein the first pinned layer structure is a first antiparallel (AP) pinned layer structure that is made by the following steps:

forming ferromagnetic first and second antiparallel (AP) pinned layers with the first AP pinned layer interfacing the first pinning layer and the second AP pinned layer interfacing the spacer layer; and forming an antiparallel (AP) coupling layer between and interfacing the first and second AP pinned layers.

59. A method of making a magnetic head assembly as claimed in claim 58 wherein the forming of the layers causes a sense current field HI to be equal to a demagnetizing field HD, a ferromagnetic field HFC and an image current field HIM on the free layer structure when a sense current is conducted through the spin valve sensor.

60. A method of making a magnetic head assembly as claimed in claim 59 wherein:

the free layer structure is formed closer to the second shield layer than to the first shield layer; and the permeability of the second material is higher than the permeability of the first material.

61. A method of making a magnetic head assembly as claimed in claim 59 wherein:

forming the free layer structure closer to the first shield layer than to the second shield layer; and forming the first material with a higher permeability than the permeability of the second material.

62. A method of making a magnetic head assembly as claimed in claim 58 wherein the making of the spin valve sensor further includes the steps of:

forming a second antiparallel (AP) pinned layer structure;

forming a nonmagnetic conductive second spacer layer located between the free layer structure and the second AP pinned layer structure;

forming an antiferromagnetic second pinning layer;

a making of the second AP pinned layer structure including the steps of:
forming ferromagnetic first and second antiparallel (AP) pinned layers with the first AP pinned layer interfacing the second pinning layer and the second AP pinned layer interfacing the second spacer layer; and
forming an antiparallel (AP) coupling layer between and interfacing the first and second AP pinned layers.

63. A method of making a magnetic head assembly as claimed in claim 62 wherein the second AP pinned layers of the first and second AP pinned layer structures are formed with equal magnetic thicknesses, the first AP pinned layers of the first and second AP pinned layers are formed with equal magnetic thicknesses and the magnetic thicknesses of second AP pinned layers are formed greater than the magnetic thicknesses of the first AP pinned layers.

64. A method of making a magnetic head assembly as claimed in claim 62 wherein:

the first AP pinned layer of the first AP pinned layer structure and the second AP pinned layer of the second AP pinned layer structure are formed with equal magnetic thicknesses and the second AP pinned layer of the first AP pinned layer structure and the first AP pinned layer of the second AP pinned layer structure are formed with equal magnetic thicknesses; and the magnetic thicknesses of the second AP pinned layer of the first AP pinned layer structure and the first AP pinned layer structure of the second AP pinned layer structure are formed greater than the magnetic thicknesses of the first AP pinned layer of the first AP pinned layer structure and the second AP pinned layer of the second AP pinned layer structure.

* * * * *